US012695733B2

(12) United States Patent
Crabtree et al.

(10) Patent No.: US 12,695,733 B2
(45) Date of Patent: *Jul. 28, 2026

(54) FINGERPRINT-BASED NETWORK MAPPING OF CYBER-PHYSICAL ASSETS

(71) Applicant: QOMPLX LLC, Reston, VA (US)

(72) Inventors: Jason Crabtree, Vienna, VA (US);
Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/669,529

(22) Filed: May 21, 2024

(65) Prior Publication Data

US 2024/0305614 A1 Sep. 12, 2024

Related U.S. Application Data

(63) Continuation of application No. 17/140,028, filed on Jan. 1, 2021, now Pat. No. 11,991,154, which is a
(Continued)

(51) Int. Cl.
*H04L 9/40* (2022.01)
*G06F 16/909* (2019.01)
(Continued)

(52) U.S. Cl.
CPC ........ *H04L 63/0428* (2013.01); *G06F 16/909* (2019.01); *G06F 16/951* (2019.01); *G06N 7/01* (2023.01); *H04L 9/14* (2013.01); *H04L 9/3236* (2013.01); *H04L 9/3297* (2013.01); *H04L 63/061* (2013.01); *H04L 63/12*

(2013.01); *H04L 63/1408* (2013.01); *H04L 63/1433* (2013.01); *G06N 5/01* (2023.01); *G06N 5/045* (2013.01);
(Continued)

(58) Field of Classification Search
CPC ..... H04L 63/0428; H04L 9/14; H04L 9/3236; H04L 9/3297; H04L 63/061; H04L 63/12; H04L 63/1408; H04L 63/1433; H04L 9/50; H04L 63/0442; H04L 63/123; H04L 9/0891; H04L 9/3239; H04L 67/10; H04L 67/52; G06F 16/909; G06F 16/951; G06N 7/01; G06N 5/01; G06N 5/045; G06N 5/046; G06N 20/00; G06N 5/022
See application file for complete search history.

(56) References Cited

U.S. PATENT DOCUMENTS

| | | | |
|---|---|---|---|
| 6,256,544 B1 | 7/2001 | Weissinger | |
| 7,246,156 B2 * | 7/2007 | Ginter | ................. H04L 63/1441 709/227 |

(Continued)

FOREIGN PATENT DOCUMENTS

| | | |
|---|---|---|
| WO | 2014159150 A1 | 10/2014 |
| WO | 2017075543 A1 | 5/2017 |

*Primary Examiner* — Cheng-Feng Huang
(74) *Attorney, Agent, or Firm* — NK Patent Law

(57) ABSTRACT

A system and method for fingerprint-based network mapping of cyber-physical assets, including a distributed operating system, parameter evaluation engine, at least one cyber-physical asset, at least one crypt-ledger, a network, and a scanner that retrieves stored fingerprint records and performs scans of cyber-physical assets to compare against corresponding fingerprints and update a cyber-physical graph based on the success or failure of fingerprint matching.

28 Claims, 14 Drawing Sheets

Related U.S. Application Data continuation-in-part of application No. 16/910,623, filed on Jun. 24, 2020, now Pat. No. 11,595,361, which is a continuation-in-part of application No. 15/930,063, filed on May 12, 2020, now Pat. No. 11,588,793, which is a continuation of application No. 15/904,006, filed on Feb. 23, 2018, now Pat. No. 10,652,219, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(51) Int. Cl.

| | |
|---|---|
| *G06F 16/951* | (2019.01) |
| *G06N 7/01* | (2023.01) |
| *H04L 9/14* | (2006.01) |
| *H04L 9/32* | (2006.01) |
| *G06N 5/01* | (2023.01) |
| *G06N 5/045* | (2023.01) |
| *G06N 5/046* | (2023.01) |
| *G06N 20/00* | (2019.01) |
| *H04L 9/00* | (2022.01) |

(52) U.S. Cl.
CPC ............. *G06N 5/046* (2013.01); *G06N 20/00* (2019.01); *H04L 9/50* (2022.05); *H04L 63/0442* (2013.01); *H04L 63/123* (2013.01)

(56) References Cited

U.S. PATENT DOCUMENTS

| | | | |
|---|---|---|---|
| 8,015,143 | B2 | 9/2011 | Estes |
| 8,316,438 | B1* | 11/2012 | Bush ...................... H04L 12/66 726/22 |
| 8,788,254 | B2 | 7/2014 | Peloski |
| 8,806,621 | B2* | 8/2014 | Maguire ................... H04L 9/32 713/160 |
| 8,825,662 | B1 | 9/2014 | Kingman et al. |
| 8,856,936 | B2 | 10/2014 | Datta Ray et al. |
| 9,020,802 | B1 | 4/2015 | Florissi et al. |
| 9,122,694 | B1 | 9/2015 | Dukes et al. |
| 9,128,961 | B2* | 9/2015 | Sparks ..................... H04L 67/52 |
| 9,171,079 | B2 | 10/2015 | Banka et al. |
| 9,299,029 | B1 | 3/2016 | Kim |
| 9,350,550 | B2 | 5/2016 | Nix |
| 9,357,381 | B2 | 5/2016 | Cho et al. |
| 9,426,118 | B2 | 8/2016 | Kim |
| 9,451,462 | B2 | 9/2016 | Kim et al. |
| 9,535,808 | B2 | 1/2017 | Bates et al. |
| 9,602,530 | B2 | 3/2017 | Ellis et al. |
| 9,967,334 | B2 | 5/2018 | Ford |
| 10,061,635 | B2 | 8/2018 | Ellwein |
| 10,200,233 | B2 | 2/2019 | Anderson et al. |
| 10,248,910 | B2 | 4/2019 | Crabtree et al. |
| 10,262,321 | B1 | 4/2019 | Ramanathan et al. |
| 10,367,829 | B2 | 7/2019 | Huang et al. |
| 10,469,329 | B1 | 11/2019 | Eicher et al. |
| 10,657,543 | B2 | 5/2020 | Cecchi et al. |
| 10,749,857 | B2 | 8/2020 | Junio et al. |
| 10,839,687 | B2 | 11/2020 | Keller et al. |
| 11,055,707 | B2 | 7/2021 | Lingappa |
| 11,093,664 | B2 | 8/2021 | Razin |
| 11,232,414 | B2 | 1/2022 | Metnick et al. |
| 2004/0193943 | A1* | 9/2004 | Angelino ........... H04L 41/0631 714/4.1 |
| 2005/0015624 | A1* | 1/2005 | Ginter ................... H04L 63/145 726/4 |
| 2007/0018953 | A1 | 1/2007 | Kipersztok |
| 2011/0029229 | A1* | 2/2011 | Hui ......................... H04W 4/18 701/533 |
| 2012/0197911 | A1* | 8/2012 | Banka ................... G06F 16/951 707/754 |
| 2013/0104236 | A1* | 4/2013 | Ray ......................... H04L 63/20 726/25 |
| 2014/0046638 | A1 | 2/2014 | Peloski |
| 2014/0358911 | A1 | 12/2014 | McCarthy et al. |
| 2015/0371224 | A1 | 12/2015 | Lingappa |
| 2015/0379072 | A1 | 12/2015 | Dirac et al. |
| 2015/0379510 | A1 | 12/2015 | Smith |
| 2016/0203448 | A1 | 7/2016 | Metnick et al. |
| 2016/0275123 | A1 | 9/2016 | Lin et al. |

* cited by examiner

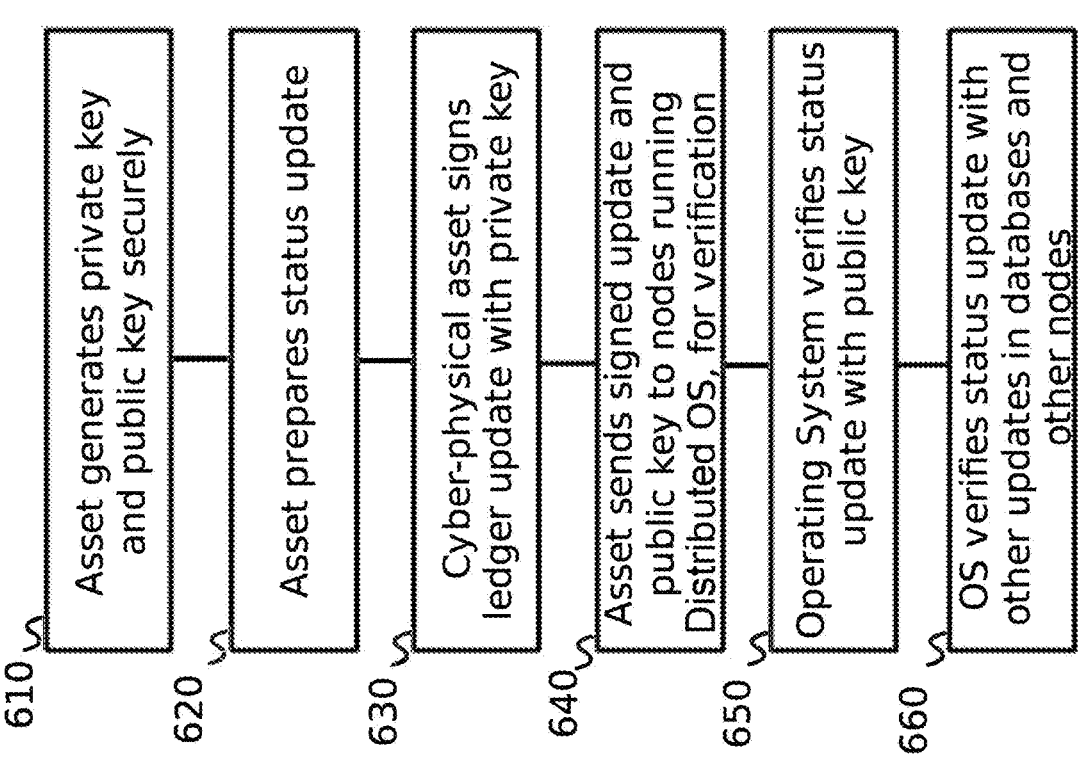

610	Asset generates private key and public key securely

620	Asset prepares status update

630	Cyber-physical asset signs ledger update with private key

640	Asset sends signed update and public key to nodes running Distributed OS, for verification 650	Operating System verifies status update with public key 660	OS verifies status update with other updates in databases and other nodes

Fig. 6

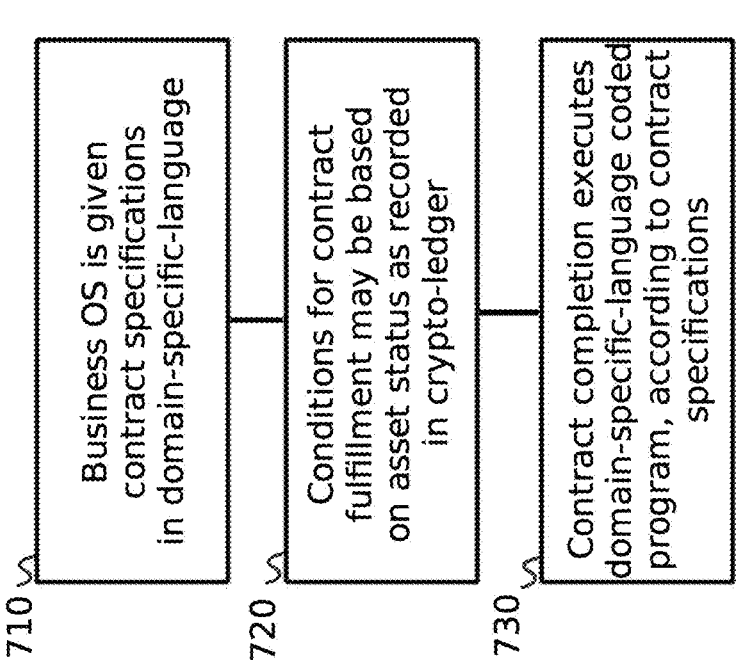
710 — Business OS is given contract specifications in domain-specific-language
720 — Conditions for contract fulfillment may be based on asset status as recorded in crypto-ledger
730 — Contract completion executes domain-specific-language coded program, according to contract specifications
Fig. 7

810 Parametric evaluation engine queries databases for asset status history

820 Asset status history is listed in UI, allowing for searching of asset parameters 830 Asset parameters may be examined over time, rather than searched for separately Clients 24

Services 23

OSes 22

Processors 21

Inputs 28

Outputs 27

Storage 26

Memory 25

FINGERPRINT-BASED NETWORK MAPPING OF CYBER-PHYSICAL ASSETS

CROSS-REFERENCE TO RELATED APPLICATIONS

Priority is claimed in the application data sheet to the following patents or patent applications, each of which is expressly incorporated herein by reference in its entirety:

Ser. No. 17/140,028
Ser. No. 16/910,623
Ser. No. 15/930,063
Ser. No. 15/904,006
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536

BACKGROUND OF THE INVENTION

Field of the Art

The disclosure relates to the field of network security, more specifically to the field of detecting and scanning for changes to assets within a network.

Discussion of the State of the Art

Currently, it is possible for corporations and individuals to track certain assets in certain ways, to ensure their safety and ensure valid operation. For example, it is possible to track packages shipped via many shipping corporations, and it is possible and commonplace to have temperature controls and monitoring in certain environments such as libraries and wine cellars. However, changes to assets such as addition, removal, or reconfiguration, necessitate updating any related asset information such as inventories or network models. It is thus necessary to verify that any newly-added assets, or assets that have been modified, can be verified to avoid falsified or erroneous records.

What is needed is a system and method for fingerprint-based network mapping of cyber-physical assets, using a time-series data store to track the state of connected resources, and a scanner that scans connected cyber-physical assets and compares their responses against fingerprint data to verify each asset and update the network information.

SUMMARY OF THE INVENTION

Accordingly, the inventor has conceived and reduced to practice, in a preferred embodiment of the invention, a system and method for fingerprint-based network mapping of cyber-physical assets. The following non-limiting summary of the invention is provided for clarity and should be construed consistently with embodiments described in the detailed description below.

To solve the problem of assets being unreachable by remote monitoring and smart-contract systems, a system for fingerprint-based network mapping of cyber-physical assets, comprising: a computing device coupled to a physical asset and comprising a first processor, a first memory, a geolocation device, and a first plurality of programming instructions stored in the memory and operating on the processor, wherein the first plurality of programmable instructions, when operating on the first processor, cause the computing device to: periodically determine a geographical location of the physical asset using the geolocation device; generate an encrypted asset status update message, the status update message comprising a device identifier of the first computing device and the geographical location of the physical asset; and transmit the encrypted asset status update message via a network to the second computing device; and a port scanner comprising at least a second processor, a second memory, and a second plurality of programming instructions stored in the second memory and operating on the second processor, wherein the second programmable instructions, when operating on the second processor, cause the port scanner to: receive a triggering event from the first computing device, the trigger event comprising a plurality of packets received over a network satisfying a preconfigured condition; retrieve a plurality of stored fingerprint records from the second memory or a database, at least one of the plurality of fingerprint records corresponding to the first computing device; perform a scan of one or more ports of the first computing device, the scan being based on the corresponding fingerprint record; analyze the results of the scan; if the analysis indicates that the results do not match the corresponding fingerprint record, transmit an encrypted failure notification to the second computing device; and if the analysis indicates that the results match the corresponding fingerprint record, transmit an encrypted success notification to the second computing device; wherein the second computing device verifies the authenticity of the received encrypted success and failure notifications and modifies a cyber-physical graph based upon the contents of the verified encrypted success and failure notifications, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 6 is a method diagram illustrating key steps in a distributed operating system interacting with data received from cyber-physical assets in databases to verify updates in a cryptographic ledger, according to a preferred aspect.

FIG. 7 is a method diagram illustrating several steps in the use of smart contracts combined with cyber-physical assets, according to a preferred aspect.

FIG. 12 is a block diagram illustrating an exemplary logical architecture for a client device.

DETAILED DESCRIPTION OF THE INVENTION

Figure 1:
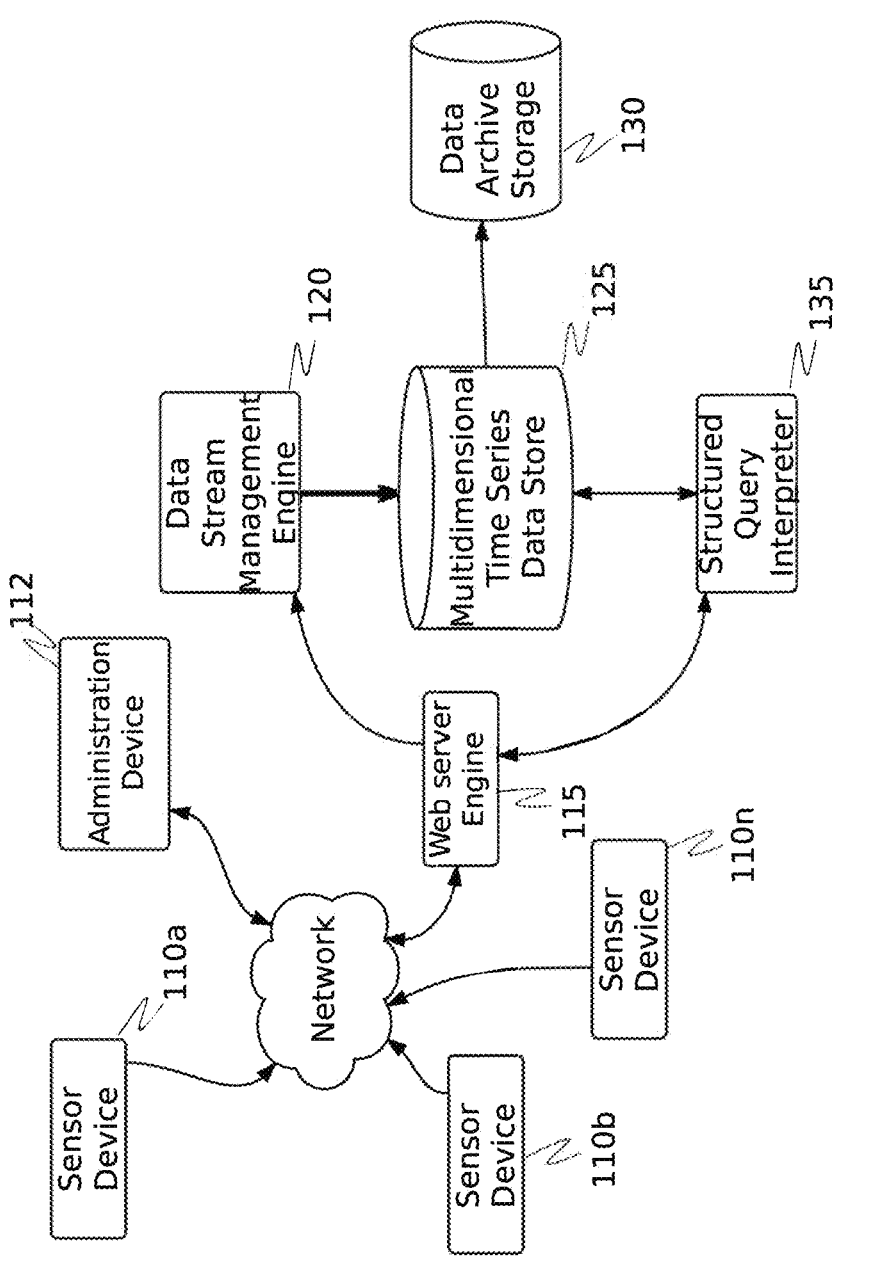
FIG. 1 is a diagram of an exemplary architecture of a system for the capture and storage of time series data from sensors with heterogeneous reporting profiles according to a preferred aspect of the invention.

The inventor has conceived, and reduced to practice, a system and method for fingerprint-based network mapping of cyber-physical assets.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

Figure 9:
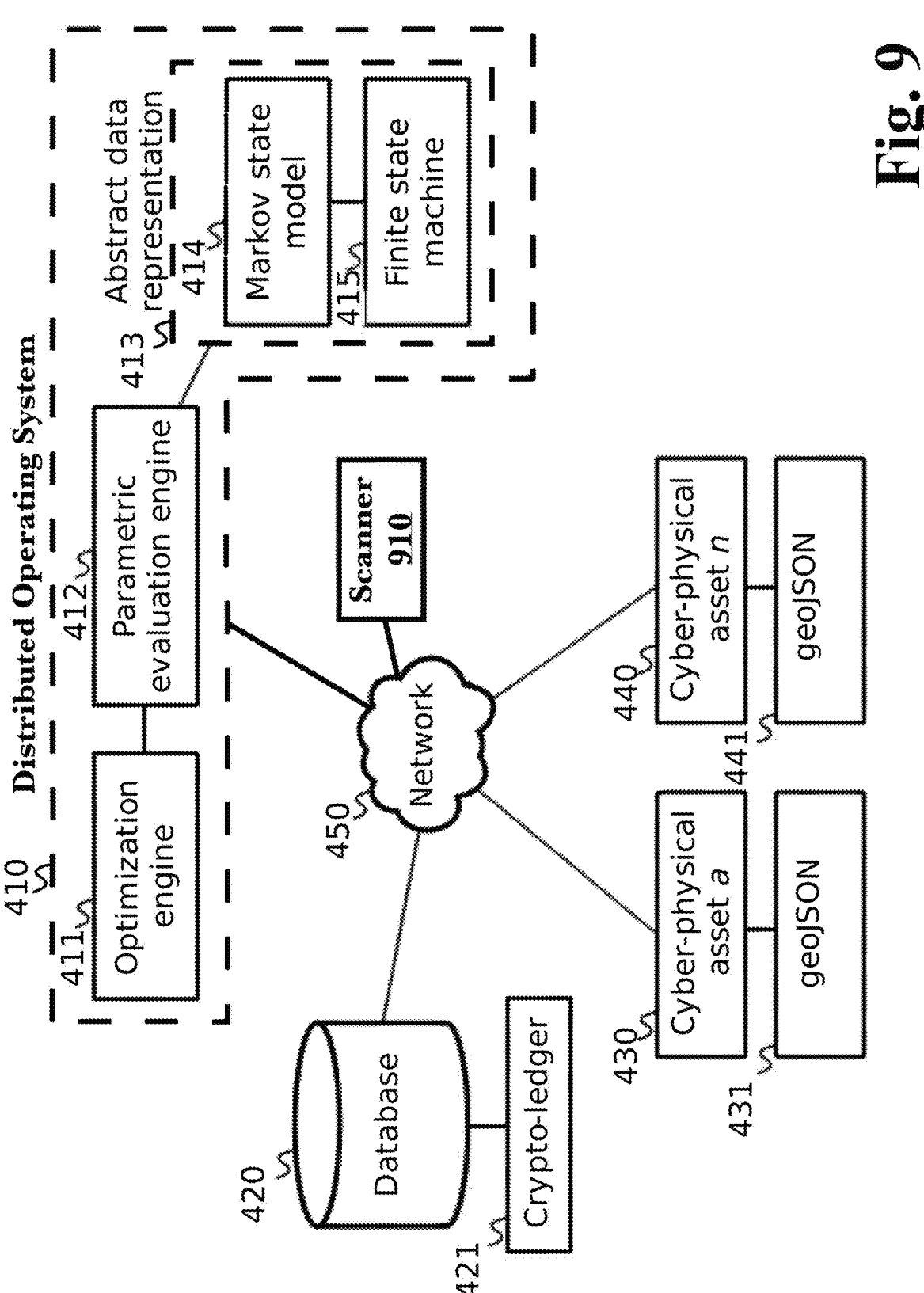
FIG. 9 is a system diagram illustrating the use of a scanner to scan cyber-physical assets against fingerprints stored in a database, according to a preferred aspect.

FIG. 9 is a system diagram illustrating the use of a scanner 910 to scan cyber-physical assets against fingerprints stored in a database, according to a preferred aspect. A distributed operating system 410 (described in greater detail below, with reference to FIG. 4) is connected to a network 450, which may be an intranet, the internet, a local area connection, or any one of many other configurations of networks. Also connected to this network 450 is at least one database 420, which holds information including a crypto-ledger 421, an implementation of a blockchain data construct, which will be expounded upon in later figures. Connected to a network 450 is at least one cyber-physical asset 430, 440, which may comprise a geolocation sensor or device (for example, a GPS receiver) as well as any number of additional sensors or stored data according to a specific implementation, and may have geoJSON 431, 441 data with which to record their geo-physical location. A cyber-physical asset 430, 440 may be a delivery crate with a possible plurality of sensors and computers embedded or attached to the crate in some way, or may be an object inside a mundane crate such as a piece of research equipment which may communicate with a distributed operating system 410 during transit, or may be a stationary object such as research equipment, computer systems, and more, which are capable of sending status updates at least consisting of geoJSON 431, 441 information regarding their geophysical location over a network 450.

A scanner 910 may be connected to the network to detect, and act on, any changes in cyber-physical assets 430, 440. Scanner 910 may also be configurable to perform manual scans in response to a command from an administrator, or according to a preconfigured schedule, or based on external events such as (for example) inventory changes, market changes, publication of a known vulnerability such as a zero-day exploit or a newly-discovered security issue, announcement of a software update or product release, or any other configurable trigger event or condition. Scanner 910 may monitor cyber-physical assets 430, 440 for any changes, such as the addition or removal of a cyber-physical asset, or changes to a cyber-physical asset's current state or configuration (such as changes in a network configuration, or changes to an installed software version), or any other change that may be observable over the network 450. Additionally, scanner 910 may listen for trigger events comprising a notification of a change that has occurred, such as (for example) an indication of a network configuration change such as a change in domain name service (DNS) resolution or a change in a router or gateway address, or a change in a cyber-physical asset's assigned Internet protocol (IP) address, or any other automated notification or indication of a change that may be sent to, or observed by, scanner 910.

When a trigger event occurs or a trigger condition is met (such as the receipt of a change notification or the receipt of a manual trigger from a system administrator, as described above), scanner 910 may retrieve any configured rules that may be stored in database 420 that may define scan behavior, and then determine a scan to perform based on the trigger and rules configuration. A scan may comprise any of a variety of techniques in any combination, including (but not limited to) initiating a port scan of a target host, transmitting a probe packet with a specific data payload to provoke a response that may be analyzed, scanning for running services or known vulnerabilities on a host machine, testing a target for a specific capability or vulnerability (for example, such a scan may be triggered in response to the announcement of a vulnerability, ensuring that systems are tested against potential security issues as they are discovered), or any other network scan or test technique.

Stored scan rules may include the use of device fingerprints, with a plurality of fingerprint records associated with each cyber-physical asset. Fingerprint records may comprise text records such as a record of open or closed ports or an exported copy of a system configuration that may be compared to a current configuration, encrypted key-based records such as a key pair wherein the stored fingerprint key may be compared against the key provided by a cyber-physical asset, hashed records that may be compared against a newly-computed hash at a cyber-physical asset, certificate/key pairs wherein a cyber-physical asset's key may be compared against a stored certificate, or any other sort of record that may be stored and compared against future records to verify their authenticity or compliance.

Scanning with a stored fingerprint may be used to enable authentication of cyber-physical assets, or verification of changes. For example, a newly-added asset may be scanned and compared against a stored fingerprint known to match the new asset's hardware information or a desired configuration. If the fingerprint match fails, the device may be configured improperly, have unauthorized hardware, or be an entirely different device than what was expected. Fingerprints may also be used to verify that a change has occurred properly, for example scanning an asset after a software update and comparing to a stored fingerprint that is known to match the intended outcome of the update; if the fingerprint match fails, the device has not updated correctly and action can be taken, such as rolling back to the previous software version or reinstalling the update.

The results of a scan, including any responses or observed behaviors of a target host, may then be analyzed to determine the capabilities or vulnerabilities of, or changes to, a cyber-physical asset. For example, a newly added device may be scanned to determine its specific capabilities and vulnerabilities, or an existing asset may be scanned to determine the nature and extent of a change that occurred. These results may then be stored in the database 420 for future use, such as to produce or update a network map or cyber-physical graph of assets based on their current state. Fingerprint-based scans may thus be used to map a network of known devices and configurations, verifying each asset against a number of stored fingerprints before incorporating it into the network map and thereby preventing erroneous records or unknown devices from being incorporated.

Figure 10:
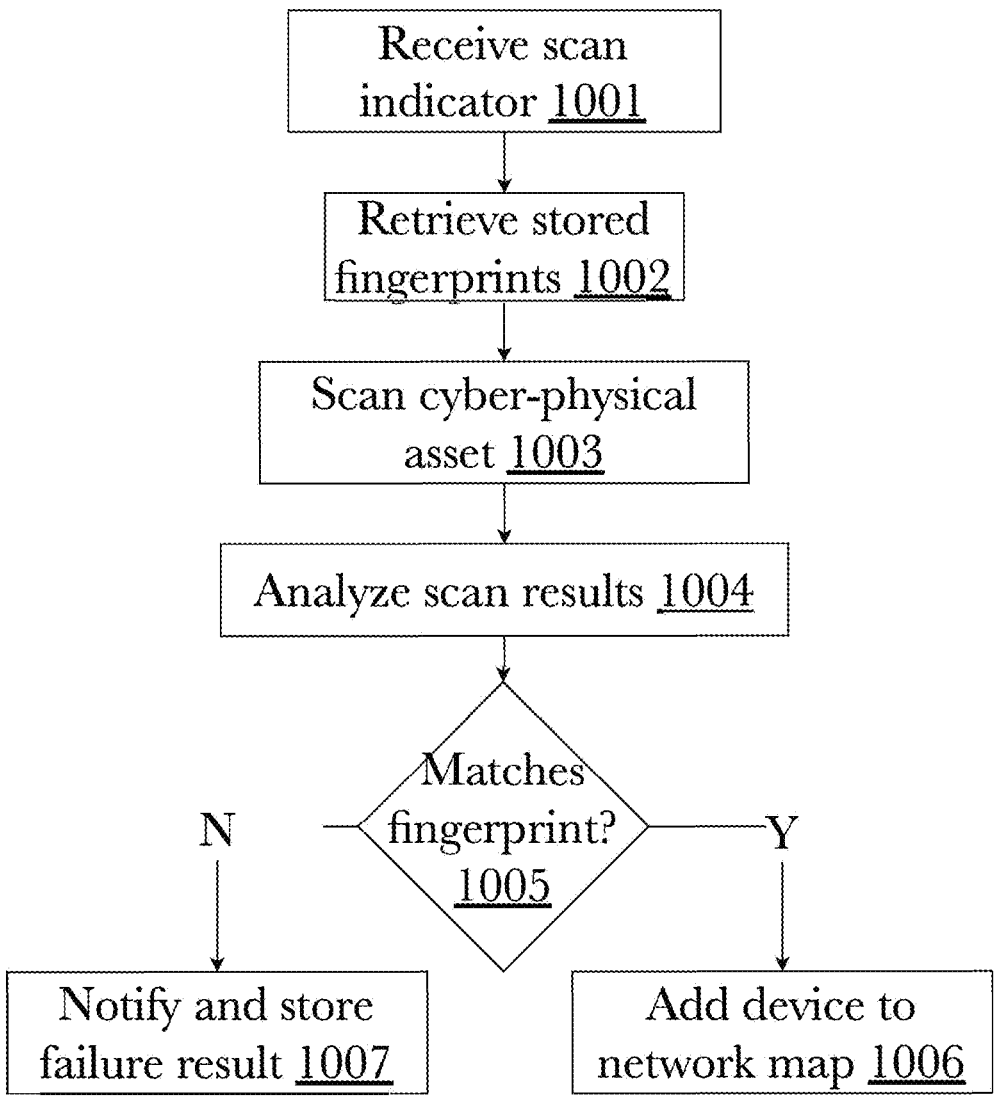
FIG. 10 is a method diagram illustrating an exemplary process for performing a fingerprint-based network scan, according to a preferred aspect.

FIG. 10 is a method diagram illustrating an exemplary process 1000 for performing a fingerprint-based network scan, according to a preferred aspect. When a scanner 910 receives a indication that a scan is needed 1001, it may retrieve stored fingerprint data 1002 from a database 420. For example, if an administrator manually initiates a scan of one or more cyber-physical assets, the scanner may retrieve any stored fingerprint records for the assets to be scanned. As another example, an update or other change to a cyber-physical asset may automatically generate a notification that is received by the scanner 910, prompting it to retrieve the associated fingerprint records and begin an automatic scan to ensure the validity of the change. A scan may then be performed 1003 of the respective cyber-physical assets based on the scan indication received, and the scan results may then be collected and analyzed 1004 to compare against the retrieved fingerprint records for each respective asset. For example, if an asset's network configuration was changed, the new configuration may be compared against a fingerprint record comprising a hashed or text-based record of the desired network configuration to ensure that the change remains within the acceptable parameters. If an asset matches the fingerprint(s) against which it was scanned, it may then be added to a network map 1007 that may be stored for future reference (such as for targeting future scans based on known previously-good assets). If an asset fails one or more fingerprint scans, a notification for each failure may be produced and stored 1008, and the asset may be removed from a network map if it was already present. This enables administrators to be notified of any failures in changes such as software or hardware updates, or if unrecognized devices are present in a network (possibly indicating an intrusion, or that an asset is an incorrect device or version).

FIG. 1 is a diagram of an exemplary architecture of a system for the capture and storage of time series data from sensors with heterogeneous reporting profiles according to a preferred aspect of the invention. In this embodiment, a plurality of sensor devices 110*a-n* stream data to a collection device, in this case a web server acting as a network gateway 115. These sensors 110*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and the to store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size.

This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
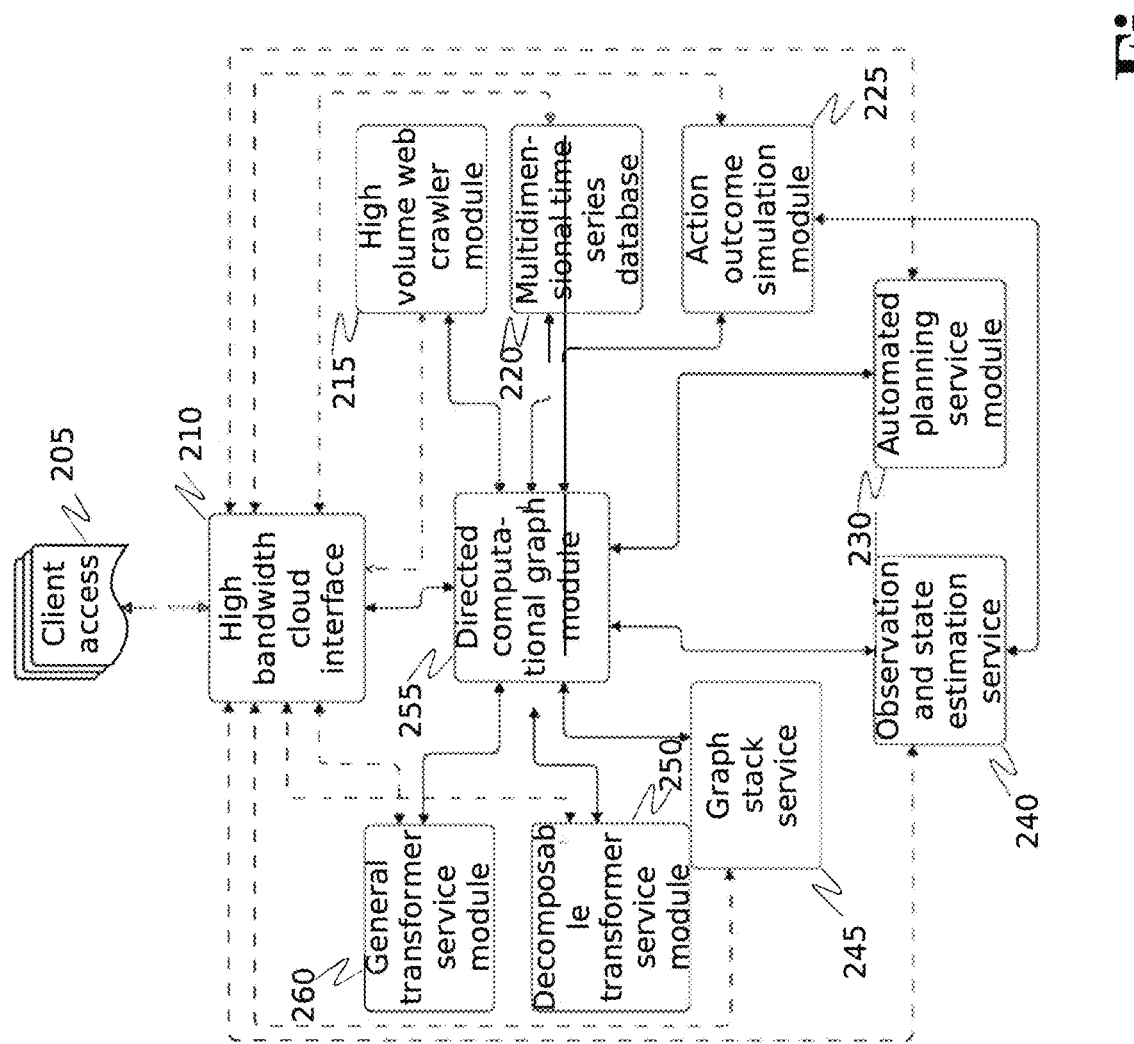
FIG. 2 is a diagram of an exemplary architecture of a distributed operating system according to a preferred aspect of the invention.

FIG. 2 is a diagram of an exemplary architecture of a distributed operating system 200 according to a preferred aspect. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the data analyzed by the system both from sources within the confines of the client, and from cloud-based sources, also enter the system through the cloud interface 210, data being passed to the analysis and transformation components of the system, the distributed computational graph module 255, high volume web crawling module 215 and multidimensional time series database 220. The distributed computational graph retrieves one or more streams of data from a plurality of sources, which includes, but is in no way not limited to, a number of physical sensors, web-based questionnaires and surveys, monitoring of electronic infrastructure, crowd sourcing campaigns, and human input device information. Within the distributed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The distributed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web-based sources that are not well tagged by conventional web crawling technology. Multiple dimension time series database module 220 receives data from a large plurality of sensors that may be of several different types. The module is designed to accommodate irregular and high-volume surges by dynamically allotting network bandwidth and server processing channels to process the incoming data. Data retrieved by the multidimensional time series database 220 and the high-volume web crawling module 215 may be further analyzed and transformed into task optimized results by the distributed computational graph 255 and associated general transformer service 250 and decomposable transformer service 260 modules.

Results of the transformative analysis process may then be combined with further client directives, additional rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible decisions. Using all available data, the automated planning service module 230 may propose decisions most likely to result is the most favorable outcome with a usably high level of certainty. Closely related to the automated planning service module in the use of system derived results in conjunction with possible externally supplied additional information in the assistance of end user decision making, the outcome simulation module 225 coupled with the end user facing observation and state estimation service 240 allows decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away or could rent satellite time to look but both of those are expensive for a probable sensor issue, significantly less than cleaning up an oil spill though and then with significant negative public exposure. These sensor issues have happened before and the distributed operating system 200 has data from them, which no one really studied due to the great volume of columnar figures, so the alternative courses 225, 240 of action are run. The system uses all available data predicts that the fouled sensor or pump are unlikely the root cause this time due to other available data and the contractor is dispatched. She finds a small breach in the pipeline. There will be a small cleanup and the pipeline needs to be shut down for repair, but multiple tens of millions of dollars have been saved. This is just one example of a great many of the possible uses of the distributed operating system, those knowledgeable in the art will easily formulate more.

Figure 3:
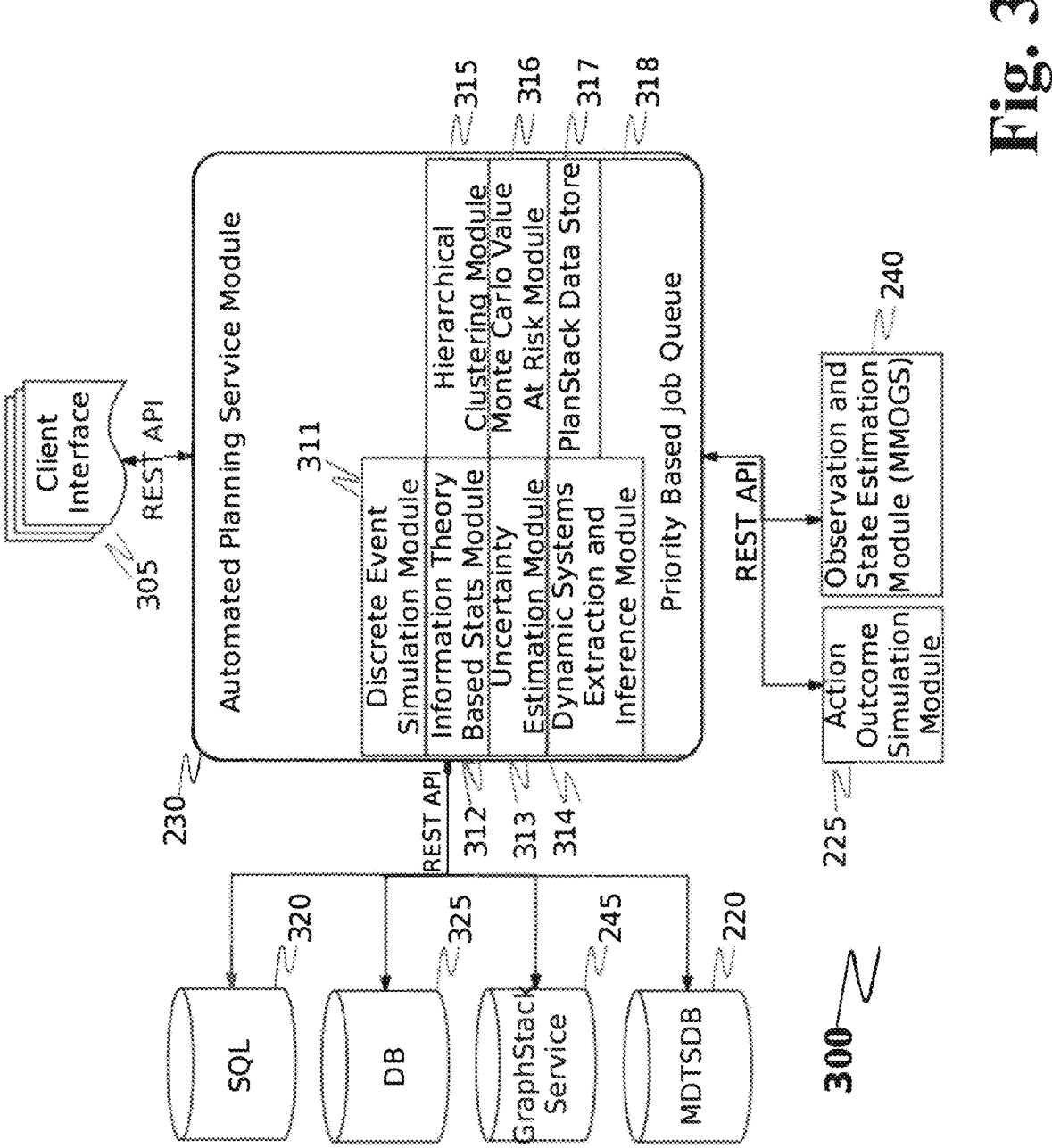
FIG. 3 is a diagram of an exemplary architecture of an automated planning service cluster and related modules according to a preferred aspect.

FIG. 3 is a diagram of an exemplary architecture of an automated planning service module and related modules 300 according to an embodiment of the invention. Seen here is a more detailed view of the automated planning service module 230 as depicted in FIG. 2. The module functions by receiving decision or venture candidates as well as relevant currently available related data and any campaign analysis modification commands through a client interface 305. The module may also be used to provide transformed data or run parameters to the action outcome simulation module 225 to seed a simulation prior to run or to transform intermediate result data isolated from one or more actors operating in the action outcome simulation module 225, during a simulation run. Significant amounts of supporting information such as, but not restricted to current conditions, infrastructure, ongoing venture status, financial status, market conditions, and world events which may impact the current decision or venture that have been collected by the distributed operating system as a whole and stored in such data stores as the multidimensional times series database 220, the analysis capabilities of the distributed computational graph module 255 and web-based data retrieval abilities of the high volume web crawler module 215 all of which may be stored in one or more data stores 320, 325 may also be used during simulation of alternative decision progression, which may entail such variables as, but are not limited to implementation timing, method to end changes, order and timing of constituent part completion or impact of choosing another goal instead of an action currently under analysis.

Contemplated actions may be broken up into a plurality of constituent events that either act towards the fulfillment of the venture under analysis or represent the absence of each event by the discrete event simulation module 311 which then makes each of those events available for information theory based statistical analysis 312, which allows the current decision events to be analyzed in light of similar events under conditions of varying dis-similarity using machine learned criteria obtained from that previous data; results of this analysis in addition to other factors may be analyzed by an uncertainty estimation module 313 to further tune the level of confidence to be included with the finished analysis. Confidence level would be a weighted calculation of the random variable distribution given to each event analyzed. Prediction of the effects of at least a portion of the events involved with a venture under analysis within a system as complex as anything from the microenvironment in which the client operates to more expansive arenas as the regional economy or further, from the perspective of success of the client is calculated in dynamic systems extraction and inference module 314, which use, among other tools algorithms based upon Shannon entropy, Hartley entropy and mutual information dependence theory.

Of great importance in any decision or new venture is the amount of value that is being placed at risk by choosing one decision over another. Often this value is monetary but it can also be competitive placement, operational efficiency or customer relationship based, for example: the may be the effects of keeping an older, possibly somewhat malfunctioning customer relationship management system one more quarter instead of replacing it for $14 million dollars and a subscription fee. The automated planning service module has the ability predict the outcome of such decisions per value that will be placed at risk using programming based upon the Monte Carlo heuristic model 316 which allows a single "state" estimation of value at risk. It is very difficult to anticipate the amount of computing power that will be needed to complete one or more of these decision analyses which can vary greatly in individual needs and often are run with several alternatives concurrently. The invention is therefore designed to run on expandable clusters 315, in a distributed, modular, and extensible approach, such as, but not exclusively, offerings of Amazon's AWS. Similarly, these analysis jobs may run for many hours to completion and many clients may be anticipating long waits for simple "what if" options which will not affect their operations in the near term while other clients may have come upon a pressing decision situation where they need alternatives as soon as possible. This is accommodated by the presence of a job queue that allows analysis jobs to be implemented at one of multiple priority levels from low to urgent. In case of a change in more hypothetical analysis jobs to more pressing, job priorities can also be changed during run without loss of progress using the priority-based job queue 318.

Structured plan analysis result data may be stored in either a general purpose automated planning engine executing Action Notation Modeling Language (ANML) scripts for modeling which can be used to prioritize both human and machine-oriented tasks to maximize reward functions over finite time horizons 317 or through the graph-based data store 245, depending on the specifics of the analysis in complexity and time run.

The results of analyses may be sent to one of two client facing presentation modules, the action outcome simulation module 225 or the more visual simulation capable observation and state estimation module 240 depending on the needs and intended usage of the data by the client.

Figure 4:
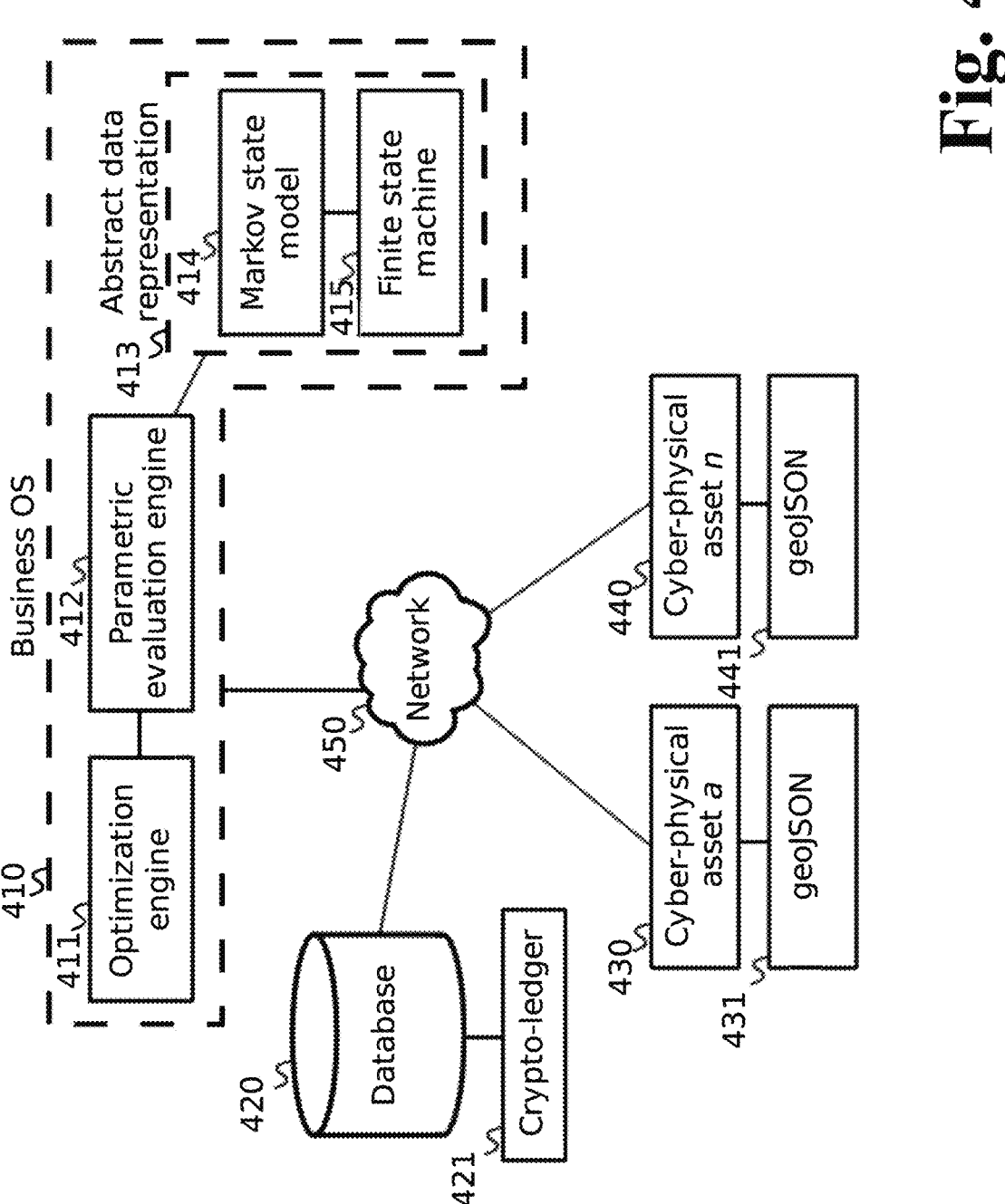
FIG. 4 is a system diagram illustrating connections between core components of the invention for geo-locating and tracking the status of cyber-physical assets, according to a preferred aspect.

FIG. 4 is a system diagram illustrating connections between core components of the invention for geo-locating and tracking the status of cyber-physical assets, according to a preferred aspect. A distributed operating system 410 operates an optimization engine 411, parametric evaluation engine 412, and uses abstract data representations 413 including Markov State Models (MSM) 414 and abstract representations of finite state machines 415 to read, modify, and generally operate on data. A distributed operating system 410 such as this is connected to a network 450, which may be an intranet, the internet, a local area connection, or any one of many other configurations of networks. Also connected to this network 450 is at least one database 420, which holds information including a crypto-ledger 421, an implementation of a blockchain data construct, which will be expounded upon in later figures. Connected to a network 450 is at least one cyber-physical asset 430, 440, which may hold any number of sensors or data according to a specific implementation, and have geoJSON 431, 441 data with which to record their geo-physical location. A cyber-physical asset 430, 440 may be a delivery crate with a possible plurality of sensors and computers embedded or attached to the crate in some way, or may be an object inside a mundane crate such as a piece of research equipment which may communicate with a distributed operating system 410 during transit, or may be a stationary object such as research equipment, computer systems, and more, which are capable of sending status updates at least consisting of geoJSON 431, 441 information regarding their geophysical location over a network 450. A distributed operating system may use a Markov State Model (MSM) 414 as a tool for data representation of the states of cyber-physical assets which send status updates in this way, and may or may not reduce a MSM to a finite state machine representation 415 with or without stochastic elements, according to a preferred aspect. These data representations 413 are useful for visualizing and analyzing current, previous, and possible future states of assets 430, 440 connected to an operating system 410 over a network 450.

Figure 5:
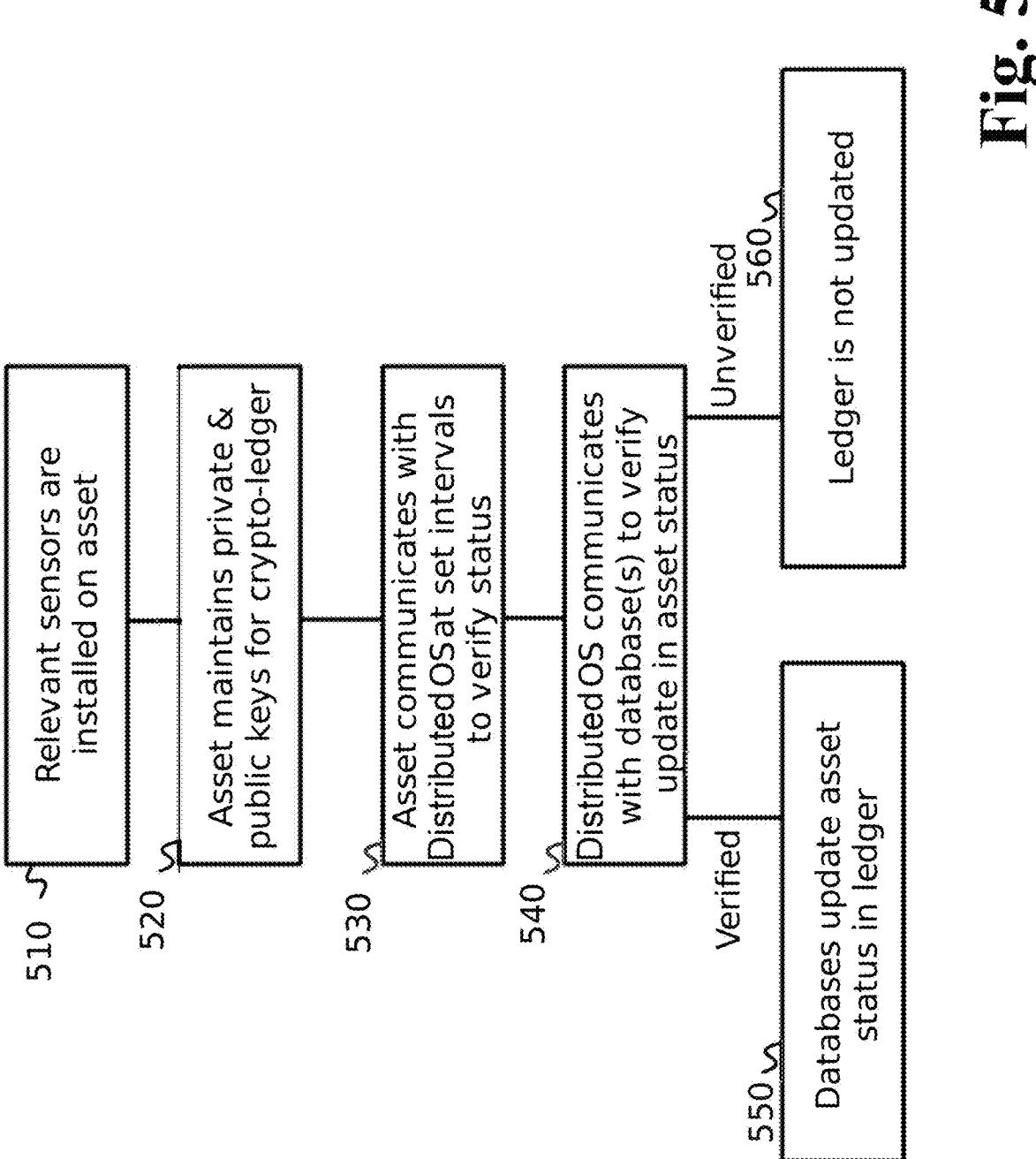
FIG. 5 is a method diagram illustrating key steps in the communication between cyber-physical assets and remote servers, according to a preferred aspect.

FIG. 5 is a method diagram illustrating key steps in the communication between cyber-physical assets 430, 440 and remote servers running a distributed operating system 410, according to a preferred aspect. Any relevant sensors or sensing equipment and software must be installed on the asset 510 first, before relevant data can be sent to a distributed operating system 410. Such sensors may include a variety of implementations, including temperature sensors, GPS tracking software, accelerometers, or any other sensors and accompanying hardware and software as needed or desired by the user upon implementation of this system. The cyber-physical asset 430, 440 will maintain, as part of their software involvement in the system, a private key, and the requisite software for a crypto-ledger 421 implementation 520 using blockchain technology. Blockchain technology is essentially a method for secure message sending between network connected devices, often used for the purposes of transaction ledgers and smart contracts, using asymmetric encryption. The cyber-physical asset will be in communication with a distributed operating system 410 either continuously or at set intervals 530, depending on individual implementations, according to a preferred aspect. During these communications, the asset will, using the asymmetric encryption in blockchain crypto-ledgers, send status updates based on any sensors installed on the asset 530. A distributed operating system that receives these updates will then verify them with previous status updates in databases 540 to ensure that the updates received are legitimate, and not forged or from a dubious source. If the public key, or signature, or contents of the encrypted message are not able to be verified properly, the ledger held in at least one database is not updated 560. If they are properly verified and indicate they are from the real asset and indicate a legitimate status update, any databases which hold a copy of the crypto-ledger 421 are updated with the new status of the asset 550. It will be apparent to one skilled in the art that additional uses for an update verification process may be that partial updates (for example, with certain pieces of data not sent to the server in the status update) may be used, and with this partial observability, missing data between status updates may be inferred using machine learning techniques. It is possible to implement a rules engine for this purpose, to determine what rules to apply for inference of missing data, depending on the implementation of the system.

FIG. 6 is a method diagram illustrating key steps in a distributed operating system 410 interacting with data received from cyber-physical assets 430, 440 in databases 420 to verify updates in a cryptographic ledger 421, according to a preferred aspect. Any asset must generate a public and private key 610 in accordance with the specifications of asymmetric encryption, which are known technologies in the art. An asset must prepare an update 620, which may mean formatting data received from any installed sensors, performing any relevant calculations or modifications to raw data, and preparing any network devices for sending the data across a network 450. The cyber-physical asset 430, 440 must sign any update with its private key 630, which encrypts the update in a way that only the private or public keys can be used to decrypt. The asset, when connected to a network 450, may send the prepared and encrypted update to any "nodes" or computer systems running a distributed operating system 410, to be verified before being added onto the ledger 421, 640. Any nodes running a distributed operating system 410 will attempt to verify the asset status update 650, before then verifying with the ledger held in at least one database 420 and any other relevant nodes or computer systems with such a distributed operating system 410 that the asset update is legitimate, valid, and shall be added to the ledger of status updates from the asset 660. It is possible to implement this system and method in an ongoing identification and authentication service, for continuous updates, rather than discrete authentication and verification for discrete updates.

FIG. 7 is a method diagram illustrating several steps in the use of smart contracts combined with cyber-physical assets, according to a preferred aspect. Such smart contracts are possible as a result of implementing blockchain technology to not only keep track of and verify entries in crypto-ledgers 421, but to store and execute distributed programs, for the purposes of self-enforcing contracts, known as smart contracts. In this implementation, a smart contract is implemented with a domain-specific-language (DSL) which may be provided by a vendor of the system or specified by a user of the system 710. A DSL may be thought of as a custom programming language, and may, depending on the implementation, also be an otherwise unmodified implementation of a programming language, according to a preferred aspect. Conditions for smart contracts in this system may be based on the past, present, or future status of cyber-physical assets monitored by the system 720. Upon completion of whatever conditions are programmed into a smart contract, the contract program executes, which may perform any number of tasks that may be programmed into a computer, including withdrawal of funds, depositing of funds, messages sent across a network 450, or other similar results of an executed program 730, according to a preferred aspect. These parametrically-triggered remuneration contracts may be versatile and diverse in their implementation according to the needs of the consumer.

Figure 8:
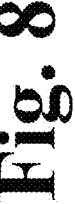
FIG. 8 is a method diagram illustrating key steps in the function of a parametric evaluation engine, according to a preferred aspect.

FIG. 8 is a method diagram illustrating key steps in the function of a parametric evaluation engine 412, according to a preferred aspect. A parametric evaluation engine 412 may query at least one database 420 for a ledger 421 containing previous or current status updates of at least one cyber-physical asset 430, 440, 810. This query may be performed across a network 450 from a distributed operating system 410 run on a computer system and may take the form of any database query format, including NOSQL™ databases such as MONGODB™, or SQL™ databases including MICROSOFT SQL SERVER™ and MYSQL™ databases, depending on the desired database implementation in the system, according to a preferred aspect. Asset status histories may be returned to a parametric evaluation engine 412, which may be listed to a user of the engine, in a basic user interface which allows the listing and searching of such asset status update histories 820. Asset statuses may be viewed over time as a history rather than listed separately, if desired, for the purpose of noting and examining trends in an asset's status 830, according to an aspect.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
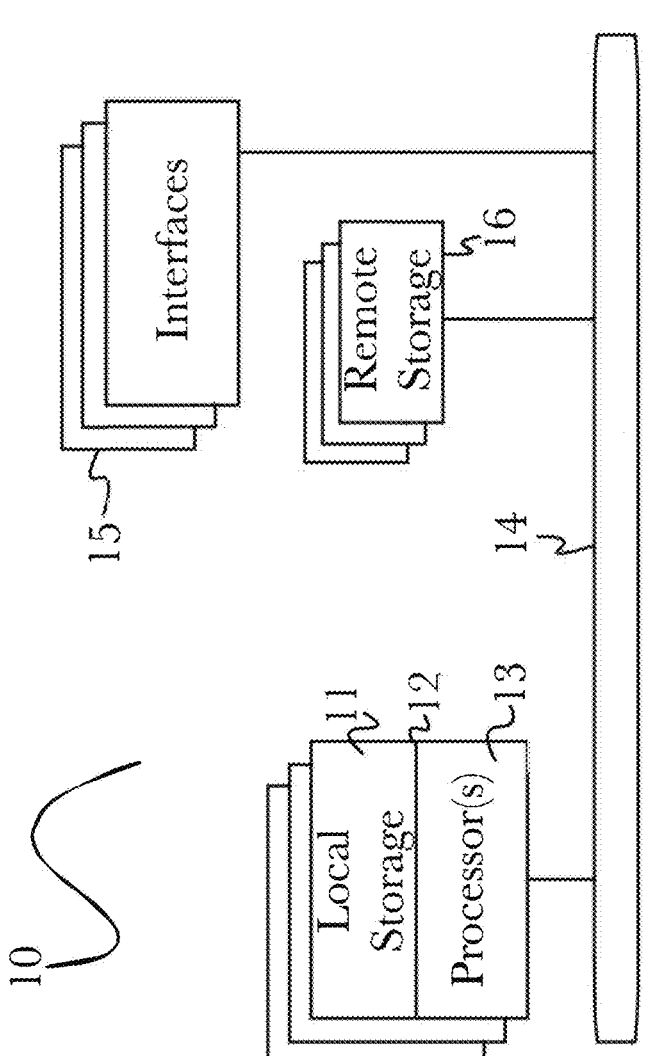
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
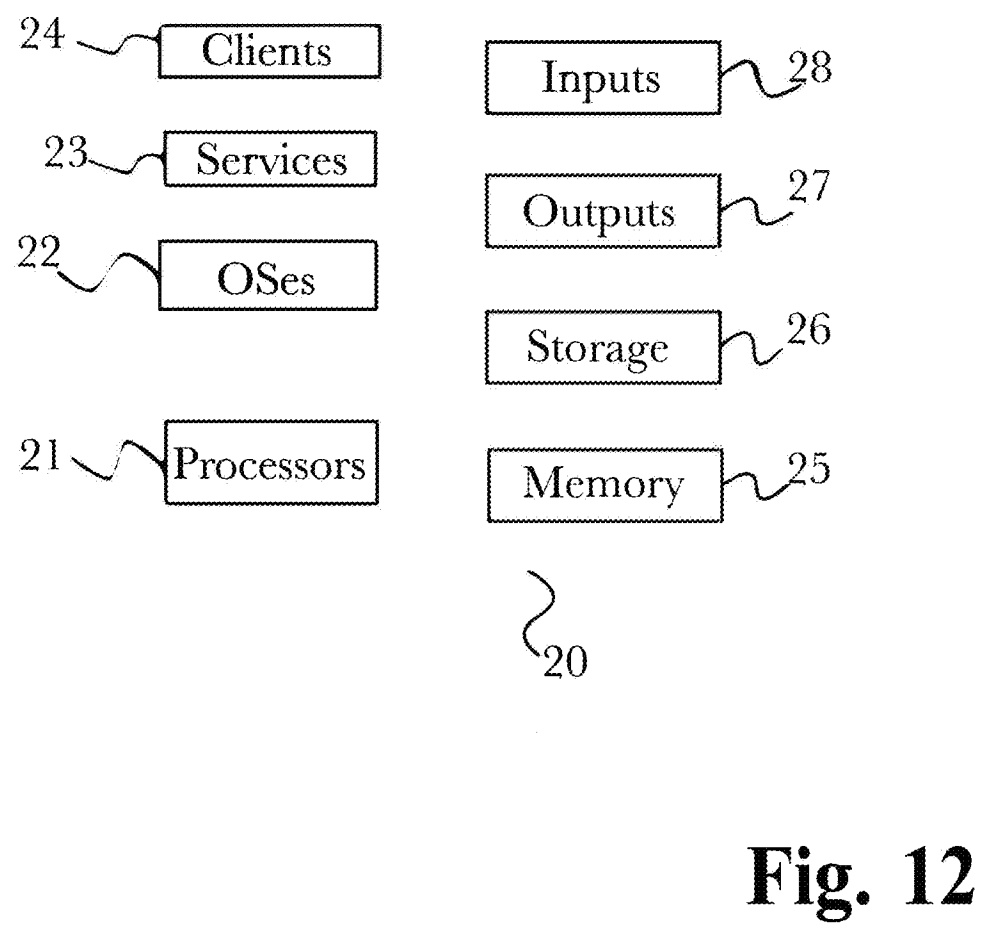

In some embodiments, systems according to the present invention may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touch-pad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
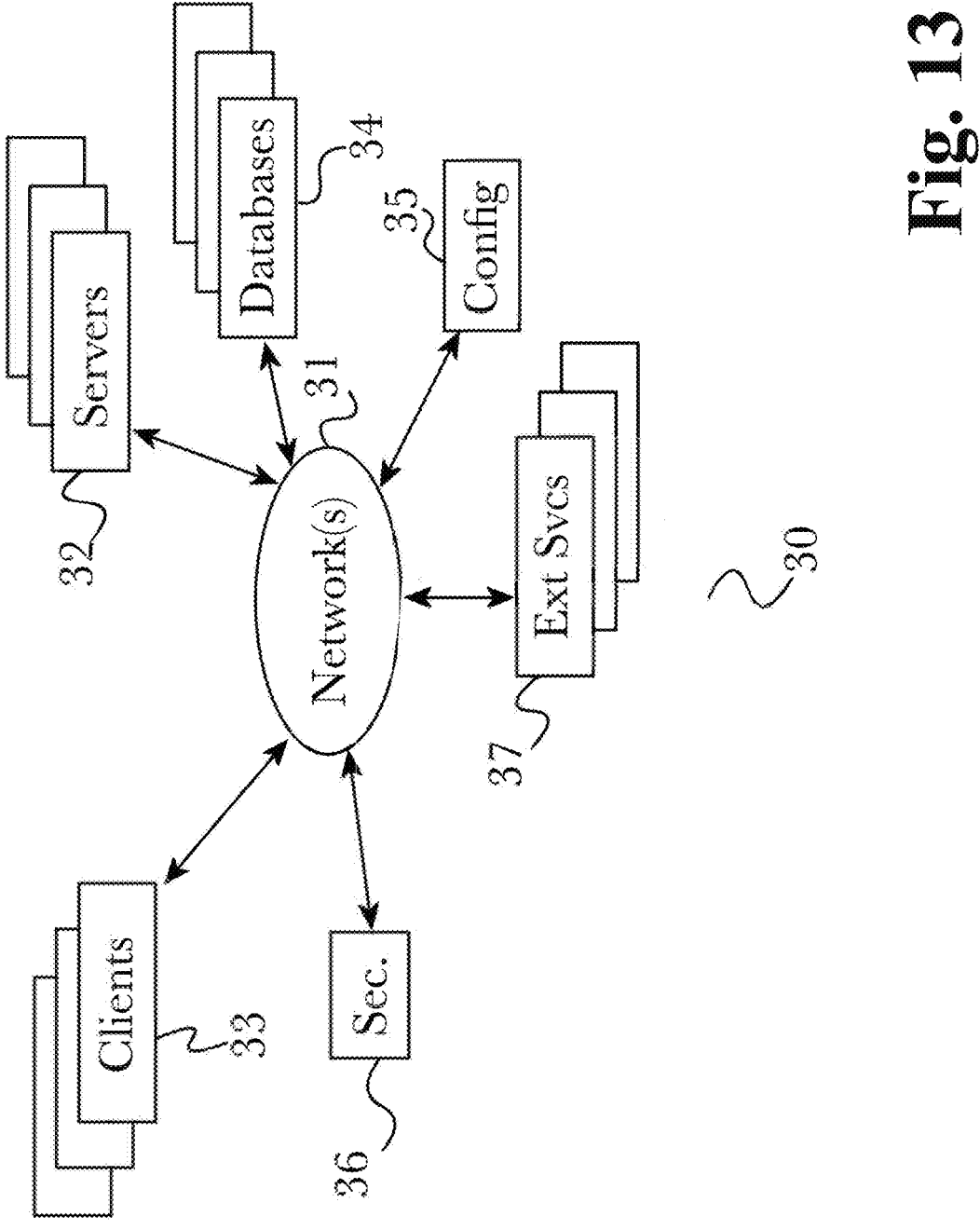
FIG. 13 is a block diagram showing an exemplary architectural arrangement of clients, servers, and external services.

In some embodiments, systems of the present invention may be implemented on a distributed computing network, such as one having any number of clients and/or servers. Referring now to FIG. 13, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 14:
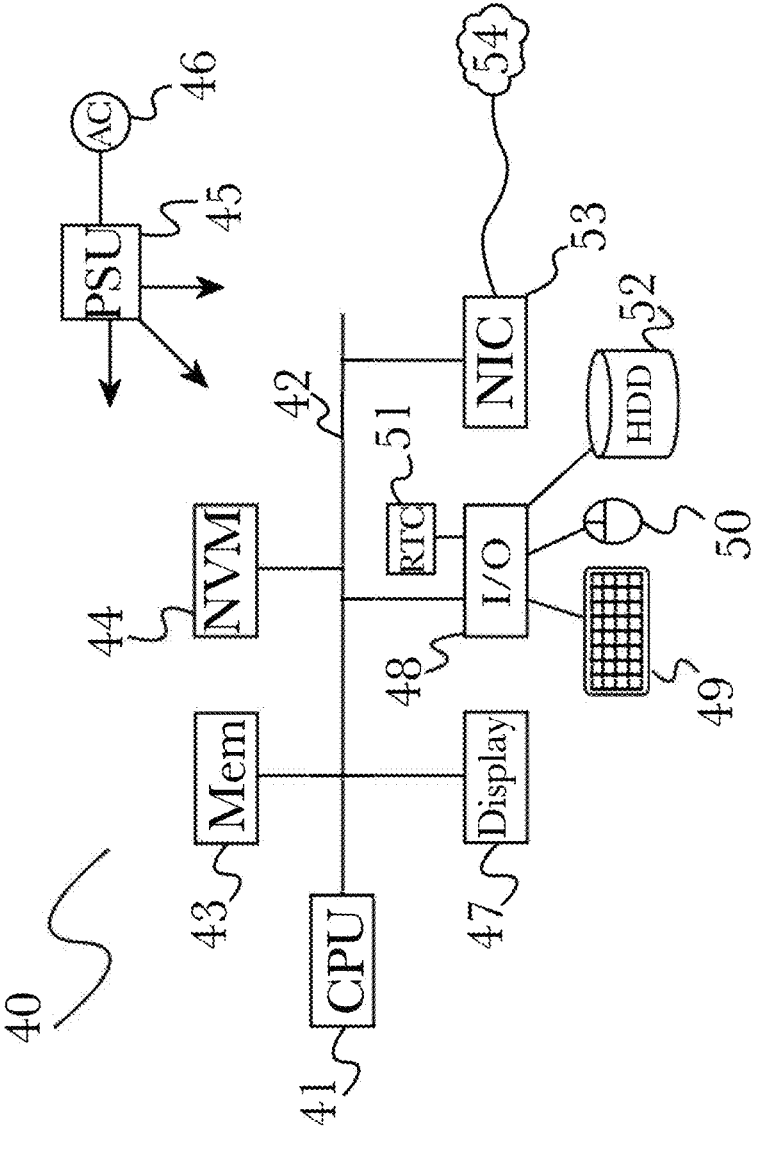
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A computing system for fingerprint-based network mapping of cyber-physical assets, the computing system comprising:

one or more hardware processors configured for:

receiving a trigger event from a first computing device, the trigger event comprising a packet that is received over a network and that satisfies a preconfigured condition;

in response to the received trigger event, performing a scan of one or more ports of the first computing device, the scan being based on a stored fingerprint record associated with the first computing device;

if results of the scan do not match the fingerprint record associated with the first computing device, transmitting an encrypted failure notification to a second computing device;

if the results of the scan match the fingerprint record associated with the first computing device, transmitting an encrypted success notification to the second computing device; and modifying an existing cyber-physical graph to include updated status information associated with the first computing device based on the verified encrypted success and failure notifications.

2. The system of claim 1, wherein the cyber-physical graph is stored in a multidimensional time-series database that is configured for receiving data asynchronously from multiple sources over a period of time, and establishing graph-series data structures with received data.

3. The system of claim 2, wherein the results of the scan are stored with attached time-series metadata.

4. The system of claim 3, wherein the attached time-series metadata comprises the time when the fingerprint record was created.

5. The system of claim 3, wherein the attached time-series metadata comprises the time at which the fingerprint record was retrieved for the scan.

6. The system of claim 3, wherein the attached time-series metadata comprises the time at which the scan was initiated.

7. The system of claim 3, wherein the attached time-series metadata comprises the time at which the scan was completed.

8. A computer-implemented method for fingerprint-based network mapping of cyber-physical assets, the computer-implemented method comprising:

receiving a trigger event from a first computing device, the trigger event comprising a packet that is received over a network and that satisfies a preconfigured condition;

in response to the received trigger event, performing a scan of one or more ports of the first computing device, the scan being based on a stored fingerprint record associated with the first computing device;

if results of the scan do not match the fingerprint record associated with the first computing device, transmitting an encrypted failure notification to a second computing device;

if the results of the scan match the fingerprint record associated with the first computing device, transmitting an encrypted success notification to the second computing device; and modifying an existing cyber-physical graph based on the verified encrypted success and failure notifications.

9. The method of claim 8, wherein the cyber-physical graph is stored in a multidimensional time-series database that is configured for receiving data asynchronously from multiple sources over a period of time, and establishing graph-series data structures with received data.

10. The method of claim 9, wherein the results of the scan are stored with attached time-series metadata.

11. The method of claim 10, wherein the attached time-series metadata comprises the time when the fingerprint record was created.

12. The method of claim 10, wherein the attached time-series metadata comprises the time at which the fingerprint record was retrieved for the scan.

13. The method of claim 10, wherein the attached time-series metadata comprises the time at which the scan was initiated.

14. The method of claim 10, wherein the attached time-series metadata comprises the time at which the scan was completed.

15. A system for fingerprint-based network mapping of cyber-physical assets, comprising one or more computers with executable instructions that, when executed, cause the system to:

receive a trigger event from a first computing device, the trigger event comprising a packet that is received over a network and that satisfies a preconfigured condition;

in response to the received trigger event, perform a scan of one or more ports of the first computing device, the scan being based on a stored fingerprint record associated with the first computing device;

if results of the scan do not match the fingerprint record associated with the first computing device, transmit an encrypted failure notification to a second computing device;

if results of the scan match the fingerprint record associated with the first computing device, transmit an encrypted success notification to the second computing device;

modify an existing cyber-physical graph to include updated status information associated with the first computing device based on the verified encrypted success and failure notifications.

16. The system of claim 15, wherein the cyber-physical graph is stored in a multidimensional time-series database that is configured for receiving data asynchronously from multiple sources over a period of time, and establishing graph-series data structures with received data.

17. The system of claim 16, wherein the results of the scan are stored with attached time-series metadata.

18. The system of claim 17, wherein the attached time-series metadata comprises the time when the fingerprint record was created.

19. The system of claim 17, wherein the attached time-series metadata comprises the time at which the fingerprint record was retrieved for the scan.

20. The system of claim 17, wherein the attached time-series metadata comprises the time at which the scan was initiated.

21. The system of claim 17, wherein the attached time-series metadata comprises the time at which the scan was completed.

22. Non-transitory, computer-readable storage media having computer executable instructions embodied thereon that, when executed by one or more processors of a computing system for fingerprint-based network mapping of cyber-physical assets, cause the computing system to:

receive a trigger event from a first computing device, the trigger event comprising a packet that is received over a network and that satisfies a preconfigured condition;

in response to the received trigger event, perform a scan of one or more ports of the first computing device, the scan being based on a stored fingerprint record associated with the first computing device;

if results of the scan do not match the fingerprint record associated with the first computing device, transmit an encrypted failure notification to a second computing device;

if the results of the scan match the fingerprint record associated with the first computing device, transmit an encrypted success notification to the second computing device; and modifying an existing cyber-physical graph to include updated status information associated with the first computing device based on the verified encrypted success and failure notifications.

23. The non-transitory, computer-readable storage media of claim 22, wherein the cyber-physical graph is stored in a multidimensional time-series database that is configured for receiving data asynchronously from multiple sources over a period of time, and establishing graph-series data structures with received data.

24. The non-transitory, computer-readable storage media of claim 23, wherein the results of the scan are stored with attached time-series metadata.

25. The non-transitory, computer-readable storage media of claim 24, wherein the attached time-series metadata comprises the time when the fingerprint record was created.

26. The non-transitory, computer-readable storage media of claim 24, wherein the attached time-series metadata comprises the time at which the fingerprint record was retrieved for the scan.

27. The non-transitory, computer-readable storage media of claim 24, wherein the attached time-series metadata comprises the time at which the scan was initiated.

28. The non-transitory, computer-readable storage media of claim 24, wherein the attached time-series metadata comprises the time at which the scan was completed.

\* \* \* \* \*